United States Patent
Dominique et al.

(10) Patent No.: US 7,647,050 B2
(45) Date of Patent: Jan. 12, 2010

(54) METHOD OF ADJUSTING A POWER LEVEL OF COMMUNICATIONS OVER A CHANNEL IN A WIRELSS COMMUNICATIONS NETWORK

(75) Inventors: Francis Dominique, Rockaway, NJ (US); Ali Masoomzadeh-Fard, Marlboro, NJ (US); Martin H. Meyers, Montclair, NJ (US); Walid E. Nabhane, Bedminster, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 401 days.

(21) Appl. No.: 11/318,466

(22) Filed: Dec. 28, 2005

(65) Prior Publication Data

US 2007/0149201 A1    Jun. 28, 2007

(51) Int. Cl.
*H04Q 7/20* (2006.01)
(52) U.S. Cl. ..................... 455/442; 455/437; 455/439; 455/443
(58) Field of Classification Search .......... 455/436–453
See application file for complete search history.

(56) References Cited

U.S. PATENT DOCUMENTS

| | | | | |
|---|---|---|---|---|
| 2003/0109221 A1* | 6/2003 | You et al. | ................... | 455/13.4 |
| 2005/0239467 A1* | 10/2005 | Nishio | ........................ | 455/442 |
| 2005/0277419 A1* | 12/2005 | Takano et al. | ................ | 455/442 |
| 2006/0256732 A1* | 11/2006 | Hamalainen | ................. | 370/252 |
| 2007/0232315 A1* | 10/2007 | Furukawa | .................... | 455/442 |

* cited by examiner

*Primary Examiner*—Patrick N Edouard
*Assistant Examiner*—Dai A Phuong
(74) *Attorney, Agent, or Firm*—Harness, Dickey & Pierce

(57) ABSTRACT

A method of adjusting a power level of communications over a channel in a wireless communications network. In the method, a determination (e.g., by a radio network controller (RNC)) is made regarding a number of base stations actively communicating with a mobile station. For example, the determination may indicate whether the mobile station is engaged in soft handoff or simplex mode. One of a plurality of power control algorithms (e.g., a fixed offset power control algorithm, a channel quality indicator (CQI) power control algorithm, etc.) is selected based on the determination. A power level of communications over the channel (e.g., a downlink communications channel to the mobile station) is then adjusted in accordance with the selected power control algorithm.

13 Claims, 3 Drawing Sheets

FIG. 3

METHOD OF ADJUSTING A POWER LEVEL OF COMMUNICATIONS OVER A CHANNEL IN A WIRELSS COMMUNICATIONS NETWORK

BACKGROUND OF THE INVENTION

1. Field of the Invention

The present invention relates generally to a wireless communications network, and more particularly, to a method of adjusting a power level of communications over a channel in a wireless communications network.

2. Description of the Related Art

Wireless communication systems typically include radio network controllers (RNCs) or mobile switching centers (MSCs), each managing a plurality of base stations where one or more base stations serve a geographic area commonly referred to as a cell. Users or subscribers of the wireless communication system use a mobile station (e.g., a cell phone, a PDA, a laptop, etc.) to communicate with each other and/or with another communication system (e.g., the Internet).

Wireless communication systems operate in accordance with established rules promulgated by governmental and industry groups. These rules are established as standards with which wireless communication systems comply. The standards contain various protocols that determine an acceptable operation for the wireless communication systems. A protocol is a set of rules with which a communication system is to be initiated, maintained and terminated. Equipment at the base stations and controllers (e.g., RNC, MSC, etc.) are referred to as system or network equipment. In wireless communication systems, communication may occur between two mobile stations or between a mobile station and system equipment.

Communication between mobile stations and one or more base stations is performed over a number of communication channels. The communication channels may be classified as either uplink (e.g., transmitted from the mobile station to the one or more base stations) or downlink (e.g., transmitted from the one or more base stations to the mobile station) communication channels. The communication channels may further be classified as being either shared or dedicated channels.

A dedicated channel is a communication link used to transfer data between a designated mobile station and a designated base station. In contrast, a shared control channel may form a communication link between any base station and any mobile station. A base station (e.g., for downlink communications) or mobile station (e.g., for uplink communications) may periodically, upon request, assume control of a shared channel, with only one entity controlling the shared channel at a given time. For example, a first mobile station requesting an uplink shared channel may transmit on the uplink shared channel for a given period of time (e.g., measured by a sub-frames). When the first mobile station is no longer assigned to the uplink shared channel (e.g., because the uplink shared channel is reassigned, because the first mobile station completes transmitting, etc.), the uplink shared channel may be reassigned to another mobile station.

Establishing power levels for transmissions on communication channels (e.g., uplink channels, downlink channels, dedicated channels, shared channels, etc.) between mobile stations and base stations is a major factor in the performance of mobile communication systems because higher transmission power levels are typically associated with higher system interference as well as increased power consumption. Further, whether or not a mobile station is engaged in soft handoff may complicate a process of selecting effective transmission power levels.

SUMMARY OF THE INVENTION

An example embodiment of the present invention is directed to a method of adjusting a power level of communications over a channel between a mobile station and a base station in a wireless communications network. The example method includes determining whether the mobile station is engaged in a soft handoff, selecting one of a plurality of power control algorithms based on the results of the determining step and adjusting the power level of communications over the channel in accordance with the selected power control algorithm.

Another example embodiment of the present invention is directed to a method of adjusting a power level of communications over a channel between a mobile station and a base station in a wireless communications network. The example method includes determining a number of base stations communicating with the mobile station, selecting one of a plurality of power control algorithms based on the results of the determining step and adjusting the power level of communications over the channel in accordance with the selected power control algorithm.

Another example embodiment of the present invention is directed to a method of adjusting a power level of communications over a channel between a mobile station and a base station in a wireless communications network The example method includes determining a number of base stations in an active set of the mobile station, selecting one of a plurality of power control algorithms based on the results of the determining step and adjusting the power level of communications over the channel in accordance with the selected power control algorithm.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, conventional soft handoff and power control issues with soft handoff will be described, followed by examples of conventional power control algorithms. Then, a hybrid power control algorithm according to an example embodiment of the present invention will be described.

Soft Handoff

A mobile station located in a particular cell being served by a base station communicates with other mobile stations and/ or with other communication systems via the base station. Wireless signals sent from a sending mobile station are transmitted to a receiving mobile station and/or to another communication system via the base station of a cell within which the mobile is located. As a mobile station moves through cells being served by a plurality of base stations, communication from the mobile station is handled by different base stations. Communication for a mobile station moving from a first cell to a second cell is transferred from a first base station serving the first cell to a second base station serving the second cell. The process by which the mobile station is transferred from the first base station (e.g., an original base station) to the second base station (e.g., a target base station) is known as "handoff." A mobile station located at an edge of a serving cell and near a target cell will typically request a handoff to the target cell based on the relative strength of communication signals (e.g., pilot signals) of the target base station or other neighboring base stations.

In many wireless communication systems, base stations periodically transmit beacons known as pilot signals. Mobile stations measure the strength of pilot signals received from the base stations. Mobile stations may request a handoff to one or more base stations based on the relative measured strengths of the pilot signals received from the base stations. Alternatively, the wireless communications network (e.g., a mobile switching center or MSC, a radio network controller (RNC), etc.) may trigger a handoff procedure based on periodic measurement reports (e.g., indicating the received signal strength of pilot signals received from the base stations) received from the mobile station and/or for other reasons, such as congestion in a cell to which the mobile station is connected.

As discussed above, wireless communications systems may operate in accordance with any number of a plurality of wireless communication protocols. A popular wireless communication protocol is Code Division Multiple Access (CDMA). Wireless communication systems operating in accordance with CDMA typically engage in a type of handoff referred to as "soft handoff". In a soft handoff, communication with one or more target base stations is established before communication with the original base station is terminated. Thus, a mobile station engaged in soft handoff actively communicates with more than one base station. In this manner, an uninterrupted transfer of service from one base station to another base station is achieved. For example, a user talking on a cellular phone may move through a first cell served by a first base station and enter a second cell served by a second base station without having to terminate and reconnect a phone call. The process of soft handoff completes when the mobile station terminates communication with all but one of the base stations.

A soft handoff in CDMA systems may be triggered based on the pilot signal strength of several sets or categories of base stations as measured by the mobile station. These sets include an active set, a neighbor set, a candidate set and a remaining set. The active set is the set of base stations through which active communication is currently established with the mobile station. The neighbor set is a set of base stations surrounding the active base stations. The candidate set includes base stations that have a higher probability of having a pilot signal strength sufficient to establish communication with the mobile station, but have not yet established such communication. The remaining set includes all other base stations in the wireless communication system not included in the active set, the neighbor set or the candidate set. Typically, the active set members include the highest measured pilot signals strengths relative to the other sets. The wireless communications network (e.g., at a radio network controller (RNC), a mobile switching center (MSC), etc.) and/or the mobile station may use these sets to control the soft handoff process.

When communications are initially established, a mobile station communicates through a single base station, which is included in the active set. However, during soft handoff, the active set contains more than one base station. The mobile station monitors the pilot signal strength of the base stations in the active set, the candidate set, the neighbor set and the remaining set. During soft handoff, when a measured pilot signal strength of a pilot signal received from a base station in the neighbor or remaining set reaches a pilot signal strength threshold, the base station sending the pilot signal is added to the candidate set and removed from its previously assigned set (e.g., the neighbor set or the remaining set) by the mobile station.

In an example where soft handoff is triggered by a mobile station and the mobile station detects a relatively strong candidate pilot signal, the mobile station transmits a measurement report to, for example, a radio network controller (RNC), along with a request to add the base station associated with the relatively strong candidate pilot signal to the mobile station's active set. The handoff request may also be transmitted in periodic measurement reports from the mobile station. The mobile measurement report is evaluated by the RNC, which coordinates the processing of a soft handoff with the base stations associated with the higher detected pilot signal strengths.

The RNC includes radio and processing equipment capable of communication with base stations in the active, neighbor, candidate and remaining sets and capable of communication, via one or more base stations, to the mobile station. The mobile measurement report contains the measured pilot signal strength for a base station that the mobile is requesting to be included in its active set. The RNC receives the mobile measurement report and determines if the requested base station has the requisite resources to serve the mobile station.

If the base station requested by the mobile station is determined by the RNC to have the requisite resources (e.g., sufficient transmit power, bandwidth, data rate, etc.) to serve the mobile station, the RNC sends a message to the mobile station indicating that the base station requested by the mobile can be added to the mobile station's active set. The mobile station adds the requested base station to its active set and sends an acknowledgment back to the RNC acknowledging that the mobile station's active set has been updated. The mobile station may then commence with communication with the added base station. During handoff, the mobile station is thereby in simultaneous communication, via a wireless communication link including one or more communication channels, with each of the active set members.

The communication link between a mobile station and a base station is often referred to as a "leg". The handoff process eventually transfers communication to one of the legs in the active set. The mobile measurement report and other messages transferred between a mobile and a RNC and between a base station and a RNC during a handoff procedure and/or immediately prior to handoff may include messages associated with a handoff or soft handoff.

A handoff process may involve adding a new leg to the active set, removing an existing leg from the active set or, if the active set is full, replacing an existing member of the active set with a new member. For each of these handoff events there is a hysteresis for handoff decision. For example, if the active set is full and a new leg becomes stronger than an existing active set member by the amount specified by replacement hysteresis, a handoff process may be triggered.

Power Control and Handoff in General

Power control is used in downlink (e.g., from a base station to a mobile station) and uplink (e.g., from a mobile station to a base station) in CDMA systems to reduce interference. For each dedicated channel (e.g., a non-shared channel, such as a dedicated physical channel (DPCH) in either the uplink or the downlink, a high-speed dedicated physical control channel (HS-DPCCH), etc.) in the CDMA system there is a closed loop to control transmission power. This may also be called inner loop power control. For downlink power control, the mobile station measures a received signal-to-interference ratio (SIR) and issues an "up" power control command if the measured SIR is below a SIR threshold. If the measured SIR is greater than the SIR threshold, the mobile station issues a "down" power control command. The power control command (TPC) is transmitted periodically to the base station(s) with which the mobile station is connected. The period of TPC transmission is called a slot or power control group. If the mobile station is in soft handoff, more than one base station receives the TPC commands.

If there is no error in the received TPC command at the base stations connected to the mobile station, the transmit powers of the connected base stations are synchronized. In other words, the transmit powers at the respective base stations engaged in soft handoff with the mobile station increase or decrease uniformly in response to the received TPC commands. In real-world operation, however, TPC commands are occasionally received in error due to, for example, a lower communication link quality between the mobile station and at least one of the base stations. Therefore, while the same TPC command is transmitted from the mobile station to each of the connected base stations, at least one base station may not be synchronized with the other base stations due to a misinterpreted TPC command.

During soft handoff, if the communication link quality is poor for one of the base stations connected to the mobile station, the TPC error rate is higher for that base station. Therefore, the leg associated with the lower communication link quality may appear to increase or decrease its transmitted power levels at random due to the misinterpreted TPC commands. This pseudo-random power level behavior is called "random walk" in downlink transmit power. In an example, random walk typically occurs at a weak leg until a system (e.g., the RNC) removes the weak leg from the active set.

During soft handoff, shared high data rate channels in the downlink of CDMA systems are usually sent through less than all of the cells in the active set. A serving cell, which is typically a cell with the best downlink connection, may be the only cell which transmits the high data rate channel to the mobile station. A shared control channel, associated with the shared high data rate channel, is used in the downlink to inform the mobile station of information related to the high data rate channel (e.g., information needed to decode data received on the shared high data rate channel). Various methodologies are used by conventional CDMA systems to control the power level of communications over the shared control channel.

Conventional Fixed Offset Power Control Algorithm

Figure 1:
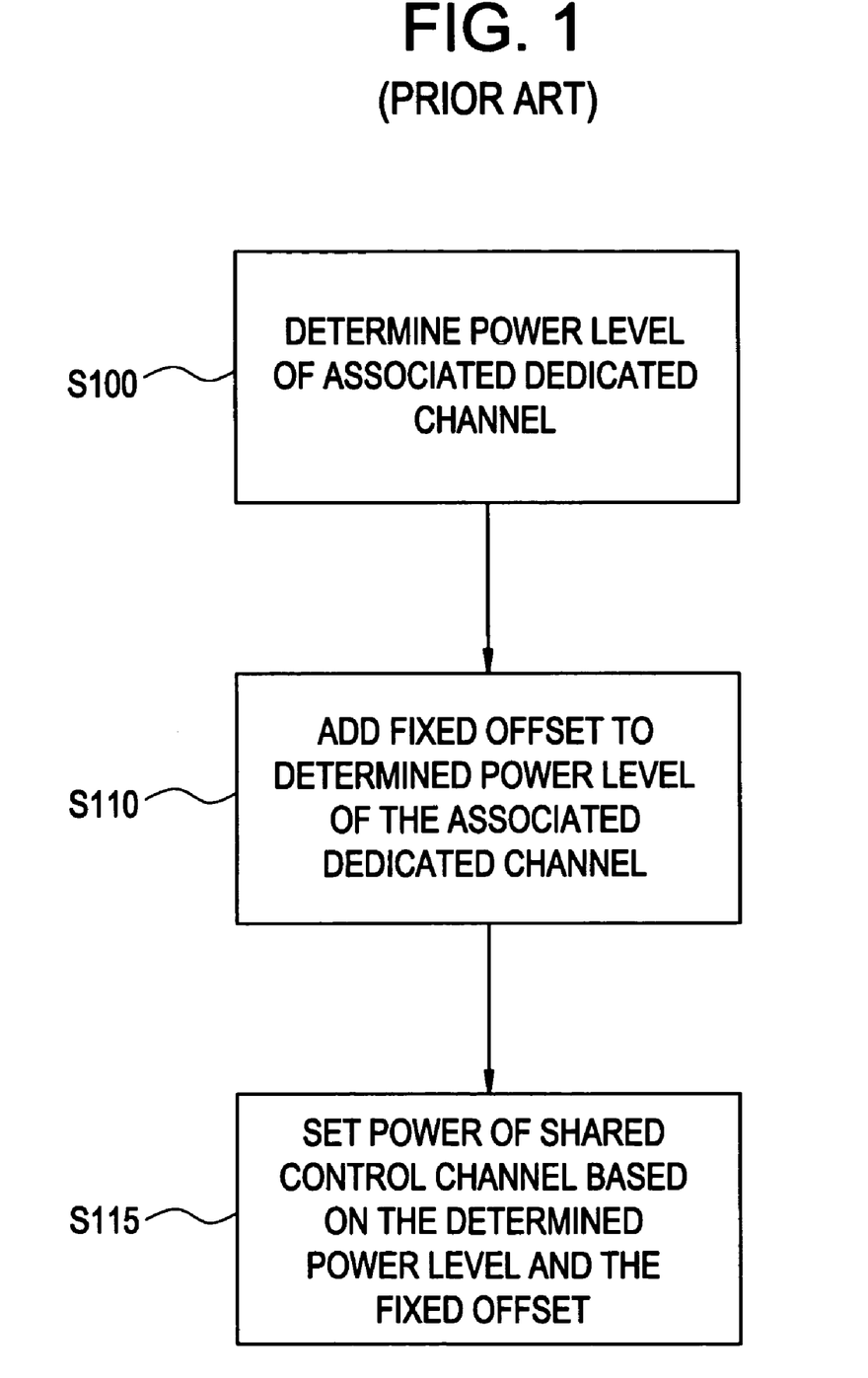
FIG. 1 illustrates a conventional fixed offset power control algorithm for adjusting a power level of transmissions over a shared control channel.

FIG. 1 illustrates a conventional fixed offset power control algorithm for adjusting a power level of transmissions over a shared control channel. As discussed above, the shared control channel is used to send information related to an associated shared downlink data channel. For example, the shared downlink data channel may be a high data rate channel and the shared control channel may send decoding information to enable a mobile station to decode information received on the shared high data rate channel.

In step S100 of FIG. 1, a base station among the active set of the mobile station determines a power level of transmissions of an associated dedicated channel (e.g., a downlink dedicated channel). The associated dedicated channel is determined through an analysis of the shared control channel on the downlink. As discussed in the Background of the Invention section, the shared high speed data channel and the control channel are "controlled" by different base stations at different times (e.g., as established by a scheduler at the RNC). The controlling base station transmits data to the mobile station on the shared high data rate channel and decoding information on the shared control channel. The downlink dedicated channel between the controlling base station and the mobile station is the "associated" dedicated channel because it is associated with the same link as the shared control channel. If there is no current controlling base station of the shared control channel, the most recent controlling base station is used to determine the associated dedicated channel.

For example, the associated dedicated channel may be a dedicated physical channel (DPCH) in the downlink, a high-speed dedicated physical control channel (HS-DPCCH), etc. Both setting and determining the power level of communications over the dedicated channel are well-known in the art and will not be described further for the sake of brevity. The power level of transmissions over the dedicated channel is known at the controlling base station.

A determined power offset is added to the determined power level of communications over the dedicated channel in step S110. Typically, the power offset is in a range of 10 decibels (dB) to 13 dB and is positive, meaning that the power offset adjusts the determined power level to a higher power level. Then, in step S115, the base station transmitting to the mobile station over the shared control channel sets the power level of transmissions over the shared control channel to the result attained at step S110.

The above-described conventional fixed offset power level algorithm is typically very effective when the mobile station is operating in simplex mode (i.e., communicating with only one base station and not engaged in soft handoff) because the power level of transmissions over the dedicated channel is based on TPC commands which are updated by the mobile station at a high rate (e.g., at every slot). Thus, the fixed offset power level is both accurate and responsive when the mobile station is operating in simplex mode.

However, the fixed offset power level algorithm is less effective if the mobile station is engaged in soft handoff. During soft handoff, the dedicated channel is transmitted along each leg of the mobile station's active set while the shared control channel remains on only one of the legs. The TPC commands generated at the mobile station for downlink power control, which are used to adjust the power level of transmissions over the dedicated channels, are based on all cells in the active set. For example, if the serving cell for the shared control channel is a weaker leg in the downlink and the other legs in the active set meet the power requirements for the mobile station, the TPC command sent by the mobile station may be a "down" command. Thus, in the above-described scenario, transmissions over the shared control channel require additional power, but less power is allotted to transmissions over the shared control channel, thereby increasing an error rate of the transmissions over the shared control channel.

Conventional CQI Power Control Algorithm

Figure 2:
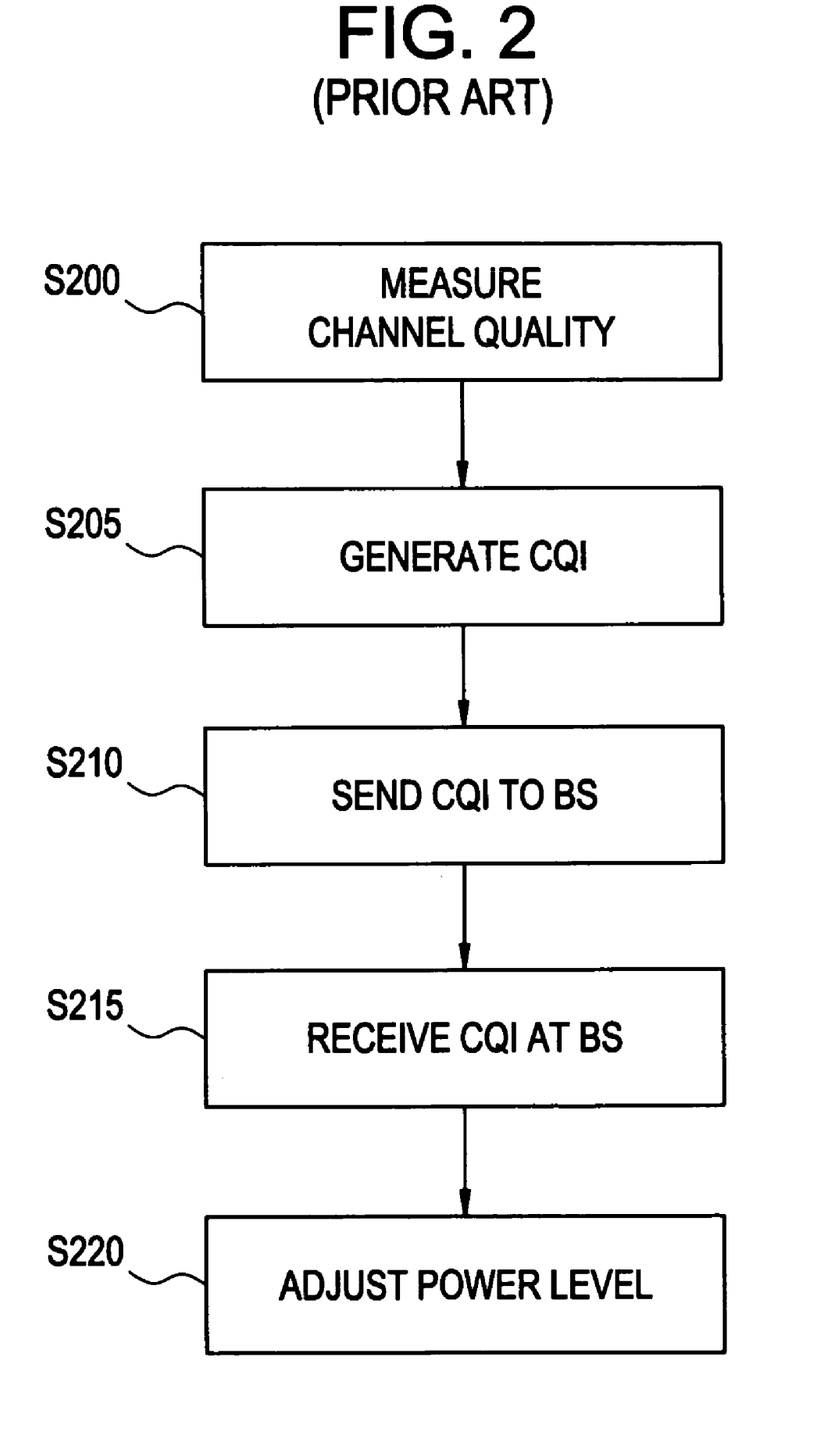
FIG. 2 illustrates a conventional channel quality indicator (CQI) power control algorithm for adjusting a power level of transmissions over a shared control channel.

FIG. 2 illustrates a conventional CQI power control algorithm for adjusting a power level of transmissions over a shared control channel. In step S200, the mobile station measures the channel quality of communications over the shared control channel received from the serving base station. The mobile station generates the CQI in step S205 based on the measured channel quality. For example, the measured channel quality (e.g., an analog metric) may be quantized (e.g., to a 5 bit binary number) at the mobile station to generate the CQI signal. The mobile station sends the generated CQI signal to the serving base station in step S210, at least once per frame, where a frame includes a plurality of slots. TPC commands are sent from the mobile station to the base station during each slot of the frame. Thus, CQI signals are sent from the mobile station to the base station at a lower rate as compared to TPC commands.

The CQI sent by the mobile station is received at the base station in step S215. After receiving the CQI signal from the mobile station, the base station uses the received CQI signal to adjust the power level of communications over the shared control signal in step S220. For example, if the CQI signal indicates a channel quality below a channel quality threshold, the power level of communications over the shared control channel is increased (e.g., by a fixed amount). In another example, if the CQI signal indicates a channel quality greater than or equal to the channel quality threshold, the power level of communications over the shared control channel is decreased (e.g., by a fixed amount).

Unlike TPC commands, CQI signals are specific to the channel for which the CQI is sent. Thus, while TPC commands may send a "down" command in certain conditions even if the serving base station requires more power, the CQI is "channel specific" and additional legs activated during soft handoff do not "dilute" the CQI in this manner. However, the higher latency associated with CQI commands, as compared to TPC commands (described above with respect to the fixed offset power control algorithm), make the CQI power control algorithm less responsive during simplex mode without providing the benefit of increased channel-specific power control accuracy (e.g., because in simplex mode TPC commands are not "diluted" as may occur, in some scenarios, during soft handoff).

Hybrid Power Control Algorithm

Figure 3:
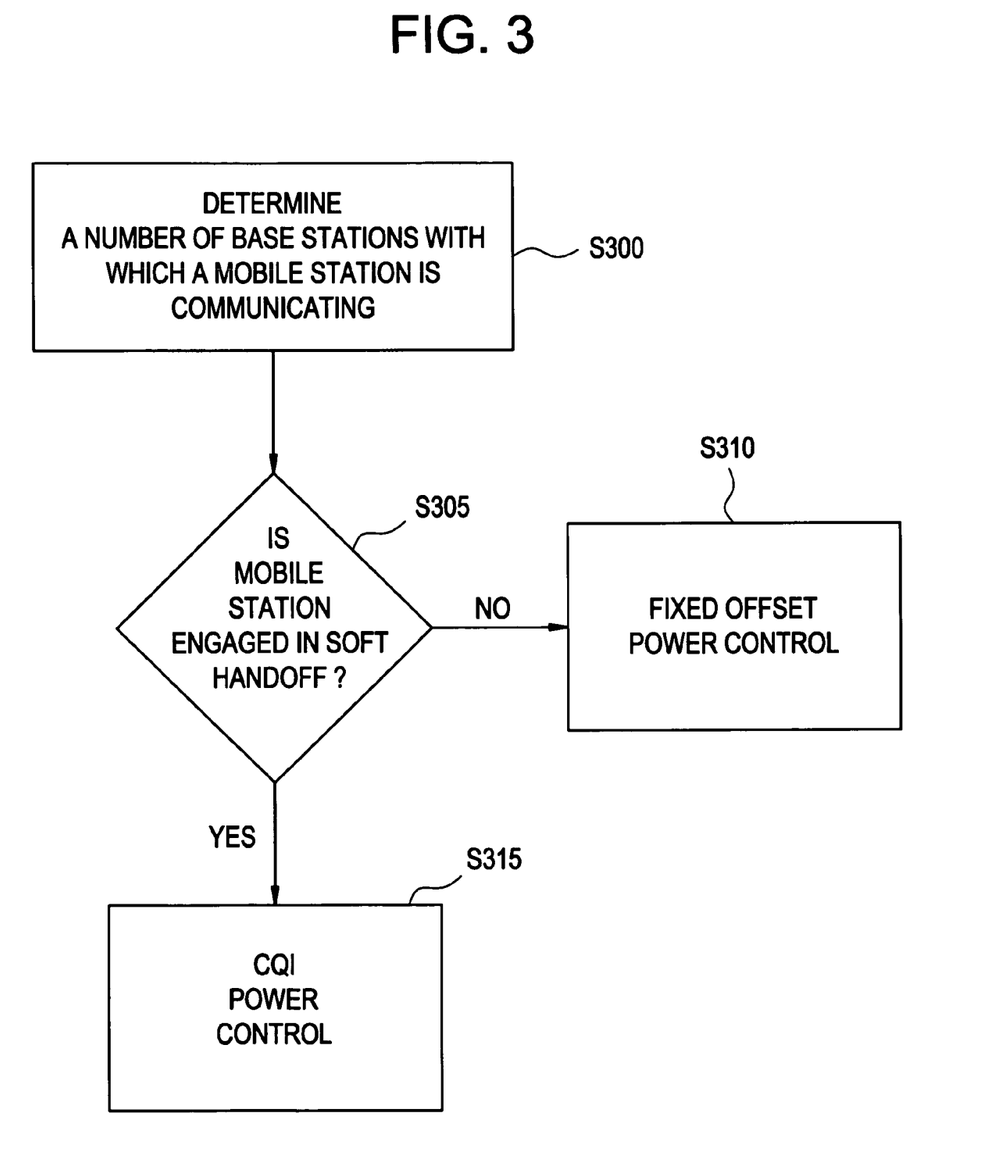
FIG. 3 illustrates a hybrid power control algorithm according to an example embodiment of the present invention.

FIG. 3 illustrates a hybrid power control algorithm according to an example embodiment of the present invention. As discussed above, each of the conventional power control algorithms provides benefits in certain operating scenarios at the expense of sacrifices in other operating scenarios. The example embodiment of FIG. 3 combines the above described conventional methods by triggering one of the conventional power control algorithms based on an operating status of the mobile station.

First, the RNC determines a number of base stations with which the mobile station is communicating in step S300. For example, the RNC checks the number of base stations in the mobile station's active set and uses this number as the determined number of base stations.

Based on the determined number of base stations in step S300, the RNC determines whether the mobile station is engaged in a soft handoff in step S305. For example, if the number of base stations in the mobile station's active set is equal to one, the RNC determines that the mobile station is engaged in simplex mode, and not soft handoff. Alternatively, if the number of base stations in the mobile station's active set is greater than one, the RNC determines that the mobile station is engaged in soft handoff.

If the RNC determines that the mobile station is not engaged in soft handoff in step S305, the RNC begins or continues to operate in accordance with the fixed offset power control algorithm (described above with respect to FIG. 1) in step 310. Otherwise, if the RNC determines that the mobile station is engaged in soft handoff in step S305, the base stations in communication with the mobile station begin or continue to operate in accordance with the CQI power control algorithm in step S315. After either of steps S310 or S315, the process waits for a change to the number of base stations in the mobile station's active set. When the number of base stations in the mobile station's active set changes, the process returns to step S300.

The hybrid power control algorithm may alternatively be expressed as a Boolean expression in another example embodiment of the present invention. For example, the Boolean logic of the hybrid power control algorithm may be expressed as If NUM_ACTIVE_SET=1 Then $SCCH\_PWR=DCH\_PWR+K;$ ElseIf NUM_ACTIVE_SET>1 Then $SCCH\_PWR=MAX\_CQI-CQI+C;$   Expression 1 where MAX_CQI is a maximum possible value for a received CQI received from the mobile station, CQI is the received CQI from the mobile station, C and K are constant values (e.g., offsets set by the system designer based on empirical study), ACCH_PWR and DCH_PWR are the instantaneous powers of communications over the shared control channel and the dedicated channel, respectively, and NUM_ACTIVE_SET is the number of cells/base stations in the active set. In Expression 1, it is assumed that the CQI value increases with better channel conditions of the serving cell in the downlink.

Example embodiments of the present invention being thus described, it will be obvious that the same may be varied in many ways. For example, while above-described example embodiments of the present invention are directed to efficiently adjusting the power level of communications over a shared control channel in the downlink direction, it is understood that other example embodiments of the present invention may be directed to efficiently adjusting communications associated with channels other than the shared control channel in either the uplink or downlink direction. Further, while the above-described example hybrid power control algorithm is directed to selecting between one of the fixed offset power control algorithm and the CQI power control algorithm, it is understood that other example embodiments of the present invention may be directed to any selective method where a power control scheme for communications over a channel is based on an operating status of a mobile station. Further, while above-described with respect to CDMA, it is understood that other example embodiments may be directed to any wireless communication protocol (e.g., GSM, etc.).

Such variations are not to be regarded as a departure from the example embodiments of the invention, and all such modifications are intended to be included within the scope of the invention.

We claim:

1. A method of adjusting a power level of communications over a channel between a mobile station and a base station in a wireless communications network, comprising:
   determining whether the mobile station is engaged in a soft handoff;
   selecting one of a plurality of power control algorithms based on the results of the determining step;
   selecting a fixed offset power control algorithm as the power control algorithm if the determining step determines the mobile station is not engaged in a soft handoff; and
   adjusting the power level of the communications over the channel in accordance with the selected power control algorithm,
   wherein the selecting step selects a channel quality indicator (CQI) power control algorithm as the power control algorithm if the determining step determines the mobile station is engaged in a soft handoff.

2. The method of claim 1, wherein the adjusting in accordance with the fixed offset power control algorithm comprises:
   determining a power level of communications over a dedicated channel between the mobile station and the base station;
   determining a fixed offset in accordance with the fixed offset power control algorithm; and
   adding the fixed offset to the determined power level.

3. The method of claim 2, wherein the dedicated channel is a downlink dedicated channel.

4. The method of claim 2, wherein the dedicated channel is one of a dedicated physical channel (DPCH) in and a high-speed dedicated physical control channel (HS-DPCCH).

5. The method of claim 1, wherein the channel is a shared control channel.

6. The method of claim 1, wherein the adjusting in accordance with the CQI power control algorithm comprises:
   receiving, from the mobile station, a CQI associated with the communications over the channel.

7. The method of claim 6, wherein the adjusting step adjusts the power level of the communications over the channel based on the received CQI.

8. The method of claim 7, wherein the adjusting step increases the power level of the communications over the channel if the CQI indicates a channel quality below a channel quality threshold.

9. The method of claim 7, wherein the adjusting step decreases the power level of the communications over the channel if the CQI indicator indicates a channel quality greater than or equal to a channel quality threshold.

10. The method of claim 1, wherein the channel is a shared control channel in a downlink with respect to the base station and the mobile station.

11. The method of claim 1, wherein the determining step determines the mobile station is engaged in soft handoff if the base station is one of a plurality of base stations actively communicating with the mobile station.

12. The method of claim 11, wherein the base station is a serving base station from among the plurality of base stations and the channel is only established between the mobile station and the serving base station.

13. A method of adjusting a power level of communications over a channel between a mobile station and a base station in a wireless communications network, comprising:
   determining whether the mobile station is engaged in a soft handoff;
   selecting one of a plurality of power control algorithms based on the results of the determining step; and
   adjusting the power level of the communications over the channel in accordance with the selected power control algorithm;
   wherein the selecting step selects one of a fixed offset power control algorithm and a channel quality indicator (CQI) power control algorithm;
   wherein the adjusting step includes determining a power level of communications over a dedicated channel between the mobile station and the base station, determining a fixed offset in accordance with the fixed offset power control algorithm and adding the fixed offset to the determined power level to adjust the power level of the communications over the channel if the selecting step selects the fixed offset power control algorithm and
   the adjusting step includes receiving, from the mobile station, a CQI associated with the communications over the channel and adjusting the power level of the communications over the channel based on the received CQI if the selecting step selects the CQI power control algorithm.

* * * * *

UNITED STATES PATENT AND TRADEMARK OFFICE
CERTIFICATE OF CORRECTION

PATENT NO. : 7,647,050 B2 Page 1 of 1
APPLICATION NO. : 11/318466
DATED : January 12, 2010
INVENTOR(S) : Francis Dominique et al.

It is certified that error appears in the above-identified patent and that said Letters Patent is hereby corrected as shown below:

On the title page, item (54) and col. 1, line 3, should read:

(54) METHOD OF ADJUSTING A POWER LEVEL OF
COMMUNICATIONS OVER A CHANNEL IN A WIRELESS
COMMUNICATIONS NETWORK

Signed and Sealed this

Sixth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,647,050 B2  Page 1 of 1
APPLICATION NO. : 11/318466
DATED : January 12, 2010
INVENTOR(S) : Dominique et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Twenty-eighth Day of December, 2010

David J. Kappos
*Director of the United States Patent and Trademark Office*